United States Patent
Yamada

(10) Patent No.: US 9,505,346 B1
(45) Date of Patent: Nov. 29, 2016

(54) SYSTEM AND METHOD FOR WARNING A DRIVER OF PEDESTRIANS AND OTHER OBSTACLES

(71) Applicant: Honda Motor Co., Ltd., Minato-ku, Tokyo (JP)

(72) Inventor: Hajime Yamada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/707,905

(22) Filed: May 8, 2015

(51) Int. Cl.
*B60Q 1/00* (2006.01)
*B60Q 9/00* (2006.01)

(52) U.S. Cl.
CPC ................... *B60Q 9/008* (2013.01)

(58) Field of Classification Search
CPC ....................................................... B60Q 9/008
USPC ........ 340/435, 434, 436, 437, 438, 905, 961
See application file for complete search history.

(56) References Cited

U.S. PATENT DOCUMENTS

| | | | |
|---|---|---|---|
| 8,098,170 B1 | 1/2012 | Szczerba et al. | |
| 8,629,903 B2 | 1/2014 | Seder et al. | |
| 9,196,168 B2* | 11/2015 | McCollough | G08G 5/04 |
| 2010/0253593 A1* | 10/2010 | Seder | G01S 13/723 345/7 |
| 2010/0253602 A1* | 10/2010 | Szczerba | G01S 13/723 345/8 |
| 2011/0025230 A1* | 2/2011 | Schulz | H05B 33/0818 315/294 |
| 2012/0320207 A1 | 12/2012 | Toyofuku | |
| 2013/0187834 A1* | 7/2013 | Nohara | G01S 7/04 345/8 |
| 2013/0293582 A1* | 11/2013 | Ng-Thow-Hing | G06T 19/006 345/633 |
| 2014/0219505 A1 | 8/2014 | Kindo et al. | |
| 2014/0268353 A1 | 9/2014 | Fujimura et al. | |
| 2014/0354684 A1 | 12/2014 | Beckwith et al. | |
| 2015/0061976 A1 | 3/2015 | Ferri | |
| 2015/0062141 A1 | 3/2015 | Hayasaka | |

FOREIGN PATENT DOCUMENTS

| | | |
|---|---|---|
| CN | 104260669 | 1/2015 |
| DE | 102011120878 | 6/2013 |
| JP | 2014006700 | 1/2014 |
| JP | 2014232501 | 1/2014 |

* cited by examiner

*Primary Examiner* — Dhaval Patel
(74) *Attorney, Agent, or Firm* — Arent Fox LLP

(57) ABSTRACT

A system for warning of potential hazards when driving a vehicle has a sensor coupled to the vehicle capturing data of objects located around the vehicle. A control unit is coupled to the sensor processing the data captured by the sensor and generating graphical representations of the objects captured by the sensor and warning indicators alerting a diver of the vehicle to the objects. The control unit calculates projected paths of the objects and a projected travel path of the vehicle. The warning indicators generated when a specified projected path of a specified object and the projected travel path intersect. A heads-up display (HUD) displays the graphical representations of the objects and the warning indicators. The warning indicators are positioned on the HUD in directions toward each associated object.

20 Claims, 8 Drawing Sheets

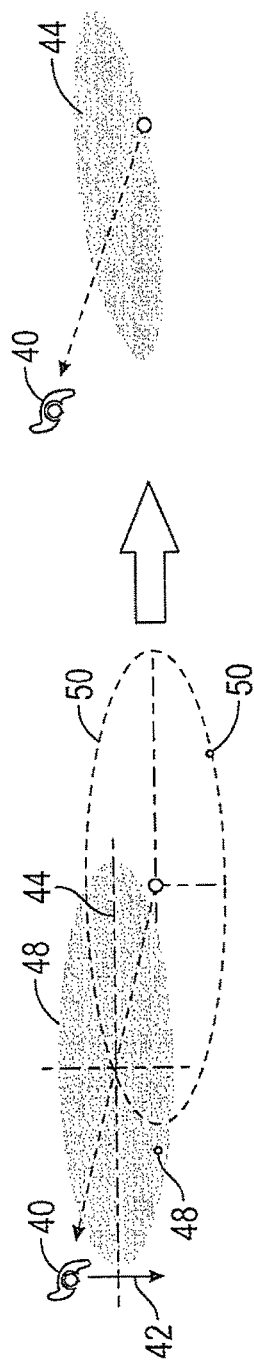
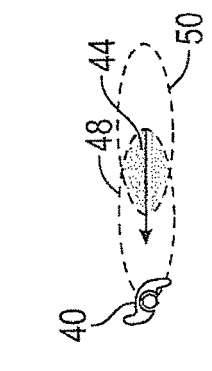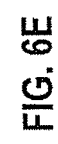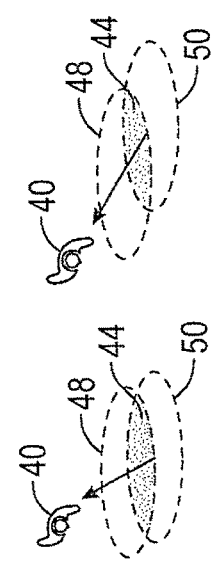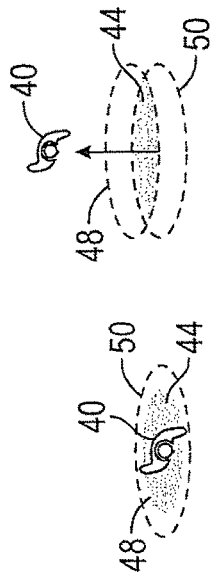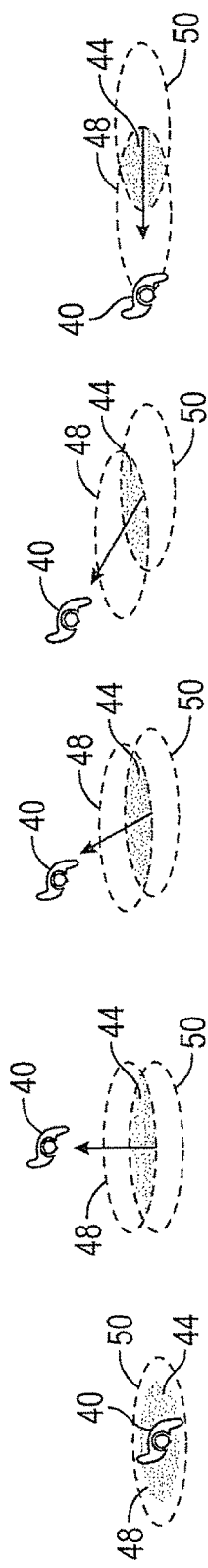

SYSTEM AND METHOD FOR WARNING A DRIVER OF PEDESTRIANS AND OTHER OBSTACLES

TECHNICAL FIELD

The present application generally relates to a vehicle warning system, and, more particularly, to a system and method for enhancing a driver's awareness of pedestrians and other objects by showing projected travel paths of the vehicle, pedestrian and/or moving objects both within and outside an effective field of view of the driver.

BACKGROUND

Motorized vehicles may be equipped with various kinds of warning systems. These warning systems may be general warning systems that may inform the driver of different operating conditions of the vehicle. For example, vehicles may be equipped with warning systems which may be used to warn the driver of low fuel amounts, high and/or low engine temperature, a drop in oil pressure, problems in charging the vehicle battery, doors and/or trunks that may be open, as well other vehicle conditions.

Motorized vehicles may be equipped with more advanced warning systems which may be used to warn the driver of the vehicle about potentially dangerous situations involving other traffic participants. For example, warning systems have been designed for vehicles that may be used to provide a driver with back-up collision warning, forward collision warning, blind spot detection, lane-departure warnings, as well as other driving condition warnings.

While the above systems do provide the driver with warnings of potential dangerous situations, these systems generally do not provide any information about a potential path of the projected danger. For example, while a blind spot detection system is able to monitor if a vehicle or other object is located in a blind spot of a vehicle, the blind spot detection system does not provide any information as to whether the vehicle and or object detected is moving towards or away from the vehicle. Similarly, while back-up warning systems may alert a driver to potential objects located behind the vehicle while the vehicle is in reverse, these systems fail to provide any information as to whether the object is moving towards or away from the vehicle. Present warning systems generally do not analyze how a pedestrian is actually moving. Beyond walking directly across a street, pedestrians may have different trajectories or paths. For example, the pedestrian may analyze traffic patterns and move in a non-direct direction.

Therefore, it would be desirable to provide a vehicle warning system and method that overcome the above problems.

SUMMARY

In accordance with one embodiment, a system for warning of potential hazards when driving a vehicle is disclosed. The system has a sensor coupled to the vehicle capturing data of objects located around the vehicle. A control unit is coupled to the sensor for processing the data captured by the sensor and generating graphical representations of the objects captured by the sensor and warning indicators alerting a diver of the vehicle to the objects. The control unit calculates projected paths of the objects and a projected travel path of the vehicle. The warning indicators generated when a specified projected path of a specified object and the projected travel path intersect. A beads-up display (HUD) displays the graphical representations of the objects and the warning indicators. The warning indicators positioned on the HUD in directions toward each associated object.

In accordance with one embodiment, a system for warning of potential hazards when driving a vehicle is disclosed. The system has image sensors coupled to the vehicle capturing pedestrians located around the vehicle. Monitoring sensors are coupled to the vehicle measuring speed and travel direction of the vehicle. A control unit is coupled to the image sensors and monitoring sensors processing data from the image sensors and monitoring sensors and generating graphical representations of pedestrians captured by the image sensors and warning indicators alerting a diver of the vehicle to the pedestrians captured. The control unit calculates projected paths for the pedestrians and a projected travel path of the vehicle. The warning indicators generated when a specified projected path of a specified pedestrian and the projected travel path of the vehicle intersect. A heads-up display (HUD) shows the graphical representations of pedestrians captured by the sensor and the warning indicators. The warning indicators positioned on the HUD in directions toward each corresponding pedestrian. The HUD displays a single warning indicator of a closest pedestrian at a time.

In accordance with one embodiment, a system for warning of potential hazards when driving a vehicle is disclosed. The system has image sensors coupled to the vehicle and capturing pedestrians located around the vehicle. Monitoring sensors coupled to the vehicle measuring speed and travel direction of the vehicle. A control unit is coupled to the image sensors and monitoring sensors processing data from the image sensors and monitoring sensors and generating three dimensional graphical representations of pedestrians captured by the image sensors and warning indicators alerting a diver of the vehicle to the pedestrians captured. The control unit calculates projected paths for the pedestrians and a projected travel path of the vehicle. The warning indicators generated when a specified projected path of a specified pedestrian and the projected travel path of the vehicle intersect. A heads-up display (HUD) shows the graphical representations of pedestrians captured by the sensor and the warning indicators. The warning indicators positioned on the HUD in directions toward each corresponding pedestrian. The HUD displays a single warning indicator of a closest pedestrian at a time. The HUD displays a first warning type indicator for a pedestrian within a field of view (FOV) of the driver and a second warning type indicator for a pedestrian out of the FOV.

BRIEF DESCRIPTION OF DRAWINGS

The present application is further detailed with respect to the following drawings. These figures are not intended to limit the scope of the present application but rather illustrate certain attributes thereof.

FIG. 5 is an elevated perspective view depicting generation of a warning indicator for use in the exemplary warning system in accordance with one aspect of the present application;

FIG. 6A-6E depicts different examples of how the warning indicator may be generated by the exemplary warning system in accordance with one aspect of the present application;

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Figure 1:
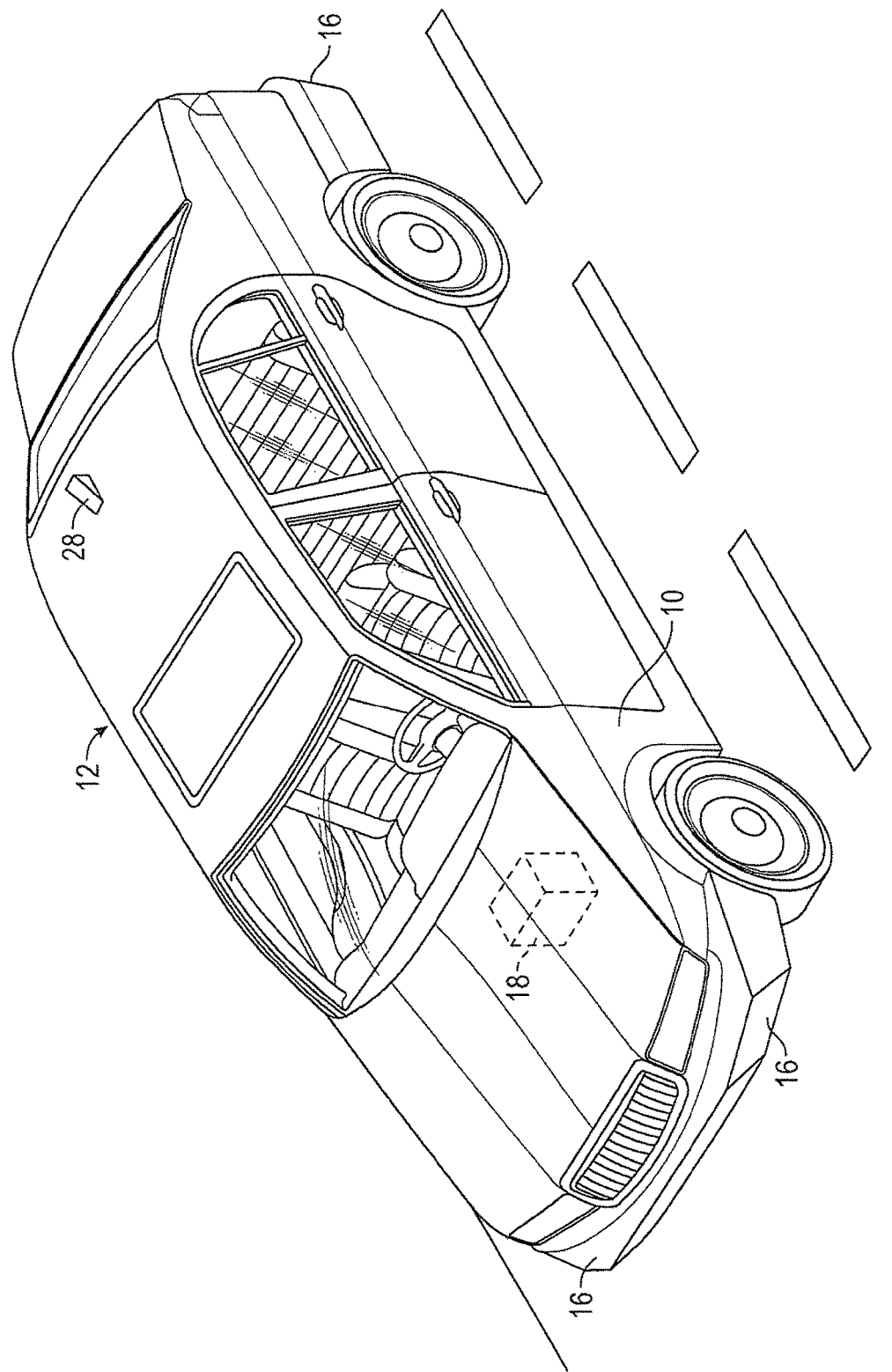
FIG. 1 is an elevated perspective view of a vehicle implementing an exemplary warning system that may be used to enhance a driver's awareness of pedestrians and objects around the vehicle in accordance with one aspect of the present application.

Referring to FIG. 1, an exemplary vehicle 10 is shown. The vehicle 10 may be equipped with a warning system 12 that may be used to enhance a driver's awareness of pedestrians and other objects by showing an estimated driving area of the vehicle 10 and projected moving paths of pedestrians and/or moving objects both within and outside an effective field of view of the driver. The warning system 12 may be configured to project actual locations and dynamics of pedestrians or other moving objects. The warning system 12 may display a warning when the moving path of a pedestrian and/or moving object intersects with the estimated driving area of the vehicle 10.

Figure 2:
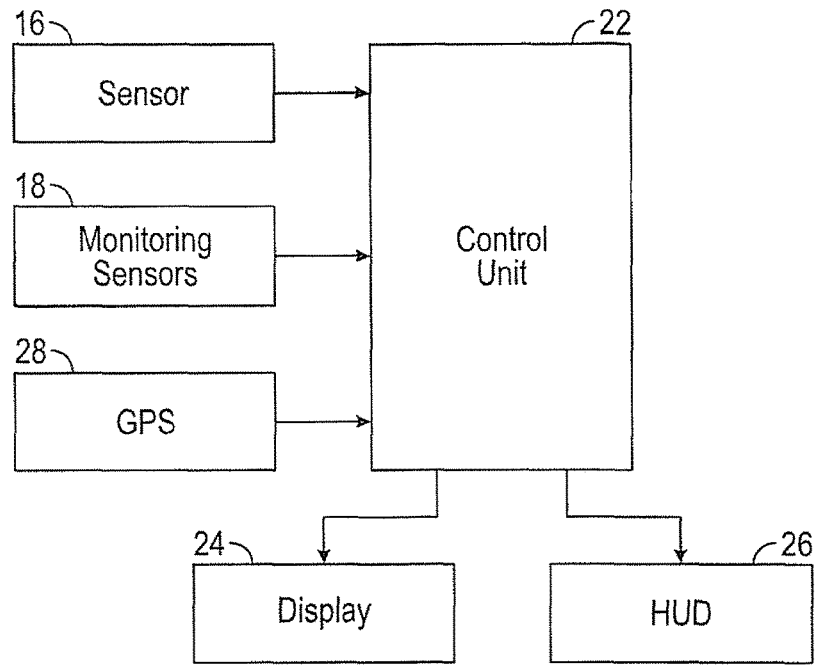
FIG. 2 is a simplified functional block diagram of the exemplary warning system depicted in FIG. 1 in accordance with one aspect of the present application.

Referring now to FIGS. 1 and 2, the warning system 12 may have a plurality of sensors 16. The sensors 16 may be positioned around a perimeter of the vehicle 10. In the embodiment shown in FIG. 1, the sensors 16 may be configured to be mounted within the body of the vehicle 10. The sensors 16 may be used to capture data of objects located around the vehicle 10. The sensors 16 may be cameras, image sensors, ultrasonic or radar sensors, or other types of image capturing devices. Alternatively, the sensors 16 may be located on the street the vehicle 10 is traveling. The sensors 16 may be configure to capture data of objects located around the vehicle 10 and transmit the captured data to the vehicle 10.

The warning system 12 may have one or more monitoring sensors 18. The monitoring sensors 18 may be coupled to one or more operating systems 20 of the vehicle 10. The monitoring sensors 18 may be used to detect operating conditions of the vehicle 10. For example, the monitoring sensors 18 may be used to monitor a speed of the vehicle 10, whether the vehicle 10 is making a turn, or other operating conditions of the vehicle 10.

The warning system 12 may have a Global Positioning Satellite (GPS) unit 28 located in the vehicle 10. The GPS unit 28 may be used to determine a geographical location of the vehicle 10, provide turn-by turn driving instructions, indicate various points of interest, as well as provide other directional data. The GPS unit 28 may be used to determine if the vehicle 10 is moving and or turning, the speed of the vehicle 10, as well as other operating conditions of the vehicle 10.

The sensors 16 and the monitoring sensors 18 may be coupled to a control unit 22. The control unit 22 may take and process the data captured by the sensors 16. The control unit 22 may process the data in order to detect and identify the different objects detected by the sensors 16. The control unit 22 may identify the position of the different objects as well as the whether the object is moving. If moving, the control unit 22 may be used to calculate the speed and direction of the moving object. The control unit 22 may then take the process data and generate graphical representations of the objects captured by the sensors 16 and provide graphical representations of the projected paths of the moving objects.

The control unit 22 may process data generated by the monitoring sensors 18 of the vehicle 10. The control unit 22 may receive data from the monitoring sensors 18 in order to determine the speed and/or the direction the vehicle 10 may be traveling. The control unit 22 may then take the speed and/or directional data and determine a projected travel path of the vehicle 10.

The warning system 12 is a dynamic system. Thus, the control unit 22 may continuously update graphical representations of the objects captured by the sensors 16 as the vehicle 10 is moving. Thus, graphical representations of projected paths of the objects detected may be continuously updated. Graphical representations indicating the projected travel path of the vehicle 10 may also be continuously updated.

The control unit 22 may be coupled to a display 24. The display 24 may be used to show the graphical representations generated by the control unit 22 of the objects captured by the sensors 16, projected paths of the moving objects, as well as the graphical representation indicating the projected traveling path of the vehicle 10. The control unit 22 may be coupled to a Heads Up Display (HUD) system 26. The HUD system 26 may be used to display the graphical representations generated by the control unit 22 of the objects captured by the sensors 16, projected paths of the moving objects, as well as the graphical representation indicating the traveling path of the vehicle 10.

The warning system 12 may be configured so that the display 24 and or HUD system 26 displays the general area viewable in front of the driver when the driver is seated in the vehicle 10 (hereinafter Field of View (FOV) of the driver). However, for objects detected by the sensors 16 but not in the FOV of the driver or towards a far edge of the FOV, for example a pedestrian located behind the vehicle 10, a string indicating a general position of the detected object and a potential danger level may be generated and shown on the display 24 and or HUD system 26.

As stated above, a Global Positioning Satellite (GPS) unit 28 may be coupled to the control unit 22. The GPS unit 28 may be used to provide geographical information to the control unit 22. Based on the location indicated by the GPS unit 28, the GPS unit 28 may load and transfer location data about the indicated location. For example, the GPS unit 28 may load and transfer satellite imagery of the current location. This imaging may be sent to the control unit 22 which may generate a graphical representation of the satellite images to be shown on the display 24 and or HUD system 26. Further, as disclosed above, the GPS unit 28 may be used to determine if the vehicle 10 is moving by monitoring the speed and direction of the vehicle 10.

Figure 3:
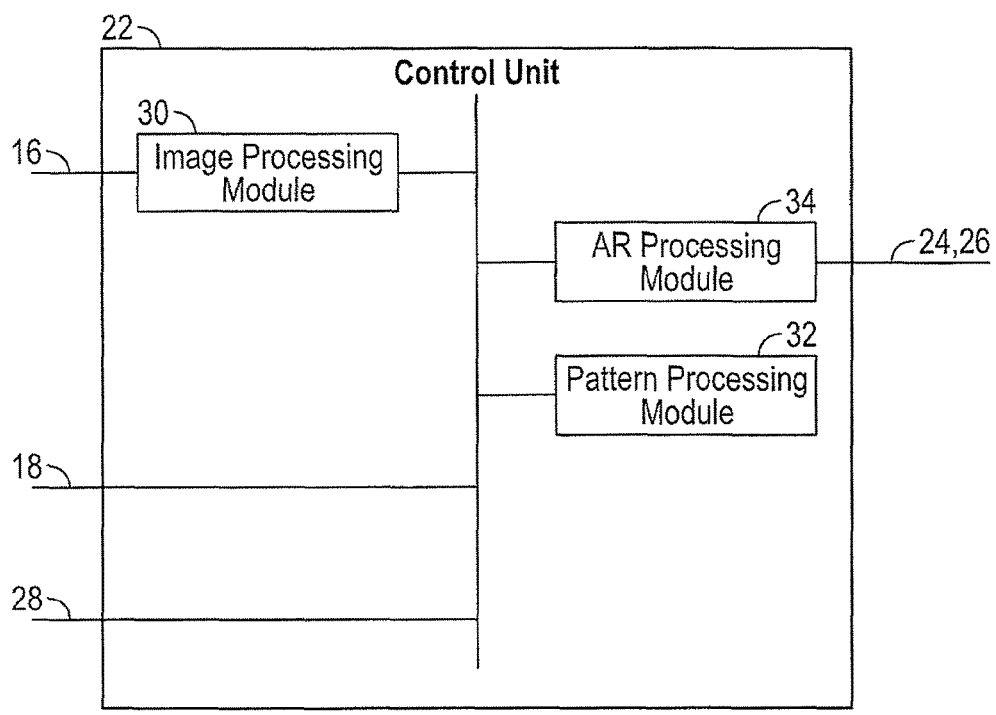
FIG. 3 is a simplified functional block diagram of a control unit shown in FIG. 2 in accordance with one aspect of the present application.

Referring now to FIG. 3, a functional block diagram of the control unit 22 may be seen. The control unit 22 may have an image processing module 30. The image processing module 30 may be coupled to the sensors 16. The image processing module 30 may process the data from the sensors 16 in order to detect and identify the different objects detected by the sensors 16. The image processing module 30 may identify the different objects detected as well as determine whether the object is moving and/or a potential moving path of the object. In accordance with one embodiment, the image processing module 30 may be configured to identify and distinguish pedestrians from other objects detected around the vehicle 10. Thus, the image processing module 30 may be used to identify potential hazardous situations to the driver, such as pedestrians or bicyclist, as opposed to non-hazardous objects such as a fire hydrant, garbage can, or other non-hazardous objects. The control unit 22 may be configured so that potential hazardous objects like pedestrians are shown, while non-hazardous objects may not be processed and or displayed.

If an object is detected as moving, the image processing module 30 may be used to calculate the speed, direction and/or potential moving path of the object. Based on the calculated speed and direction of the moving object, a path processing module 32 of the control unit 22 may be used to calculate a projected path of the moving object. The path processing module 32 may further be used to calculate a projected pathway of the vehicle 10. The path processing module 32 may receive data from the monitoring sensor 18 and or GPS unit 28 indicating speed and directional information of the vehicle 10. Based on this information, the path processing module 32 may calculate the projected pathway of the vehicle 10.

An augmented reality processing module 34 of the control unit 22 may be used to generate graphical representations of the different objects detected by the sensors 16, graphical representations of the projected paths of the moving objects and graphical representations indicating the projected traveling pathway of the vehicle 10. The augmented reality processing module 34 may further generate graphical representations of location data provided by the GPS unit 28. The graphical representations generated by the augmented reality processing module 34 may be two dimensional representations or three dimensional representations.

The graphical representations generated by the augmented reality processing module 34 may be shown on a display 24 located within the vehicle 10. Alternatively, the HUD system 26 may be used to display the graphical representations generated by the augmented reality processing module 34.

Referring to FIGS. 1-4, operation of the system 12 may be described in accordance with one embodiment of the present application. As the vehicle 10 moves along a road 36, the system 12 may calculate an estimated driving pathway 38 of the vehicle 10 based on data from the monitoring sensors 18 and/or the GPS unit 28. The driving pathway 38 may be dynamic and adjust in length/size as the vehicle 10 based on the speed and movement of the vehicle 10.

Figure 4:
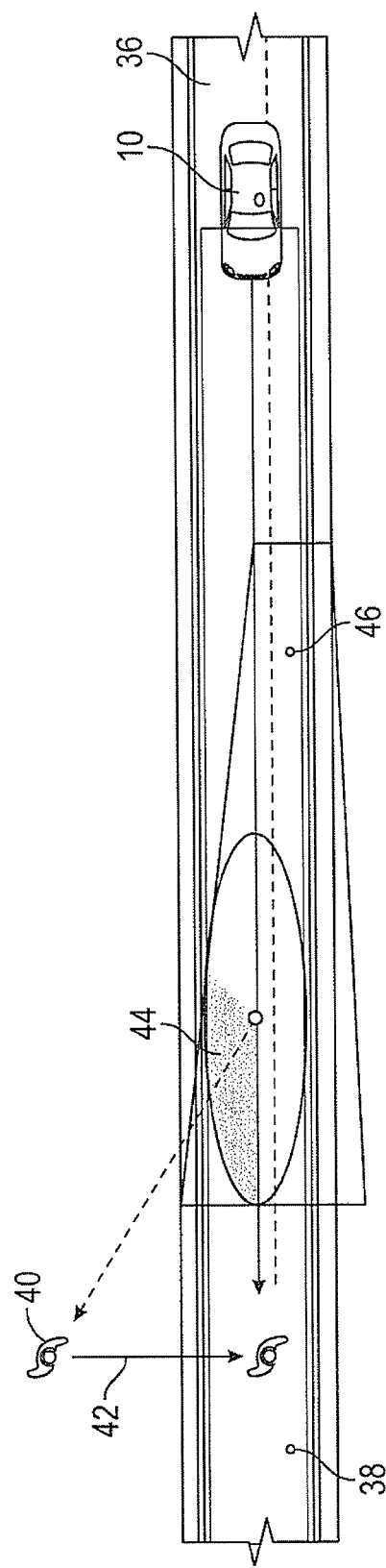
FIG. 4 a top view depicting operation of the exemplary warning system in accordance with one aspect of the present application.

The system 12 may monitor for pedestrians, bicyclist, or similar hazardous objects 40 (Hereafter pedestrians 40) located near the vehicle 10 using the sensors 16. If the pedestrian 40 is moving, the system 12 may calculate an estimated moving vector 42 of the pedestrians 40. If the moving vector 42 and/or the pedestrians 40 intersect with the estimated driving pathway 38, the system 12 may generate a potential collision warning indicator 44 (hereinafter warning indicator 44). The warning indicator 44 may be located on a display 24 or on a display area 46 of the HUD 26. The warning indicator 44 may appear in the general area where the pedestrian 40 is located and where the potential impact may occur. As shown in FIG. 4, the warning indicator 44 may be located on the upper left side of the display area 46 which may correspond to the general location of the pedestrian 40.

Referring to FIG. 5, generation of the warning indicator 44 may be described. The warning indicator 44 may be generated if the moving vector 42 and/or the pedestrians 40 intersect with the estimated driving pathway 38. A warning base 48 may be associated with each pedestrians 40 detected by the sensors 16. The warning base 48 may be an area proximate the pedestrians 40 where potential impact with the vehicle 10 may occur. The warning base 48 may indicate a general area in which the pedestrian 40 has a potential of moving and still pose a potential threat of impact with the vehicle 10. Since the pedestrian 40 may not move directly across the street but may alter the trajectory to analyze traffic patterns, avoid potholes or other obstacles, or for other reasons, the warning base 48 may indicate a potential movement area that may pose a danger for the pedestrian 40. In the embodiment shown in FIG. 5, the warning base 48 may be circular or oval in shape located proximate the pedestrian 40. However, this is shown as an example the warning base 48 may be other shapes and/or sizes. The warning base 48 may be dynamic and may change in shape and or size as the pedestrian 40 detected changes speed and/or direction of movement.

Based on the current speed and direction of the vehicle 10, the system 12 may determine an impact zone 50. The impact zone 50 may be configured to include an area in front of the vehicle 10 where impact with an object may occur. The area where the warning base 48 and impact zone 50 coincide may determine a size and shape of the warning indicator 44 as well as the location of the warning indicator 44 on the display area 46 of the HUD 26.

Referring to FIG. 6A-6E, different exemplary warning indicators 44 may be seen. Each warning indicator 44 may be formed where the warning base 48 and impact zone 50 coincide and may be positioned on the display area 46 of the HUD 26 to draw the attention of the driver to the pedestrian 40. As shown in FIG. 6A, the warning base 48 may be wholly within and impact zone 50. In this embodiment, the warning indicators 44 may be positioned in a center area of the display area 46 of the HUD 26 as the pedestrian 40 may be directly in front of the vehicle 10.

In FIGS. 6B-6E, a portion of the warning base 48 and impact zone 50 may coincide. The warning indicators 44 may each be positioned in an area of the display area 46 of the HUD 26 where the pedestrian 40 may be located. The position of the warning indicators 44 may be used to draw the attention of the driver to the location of the pedestrian 40 as indicted by the arrow 52. Thus, in FIGS. 6B-6D, the warning indicators 44 may be positioned on a left-hand side of the display area 46 of the HUD 26 where the pedestrian 40 may be located to draw the attention of the driver to the pedestrian 40. In FIG. 6E, the warning indicators 44 may be positioned in a center area of the display area 46 of the HUD 26 as the pedestrian 40 may be directly in front of the vehicle 10.

Figure 7:
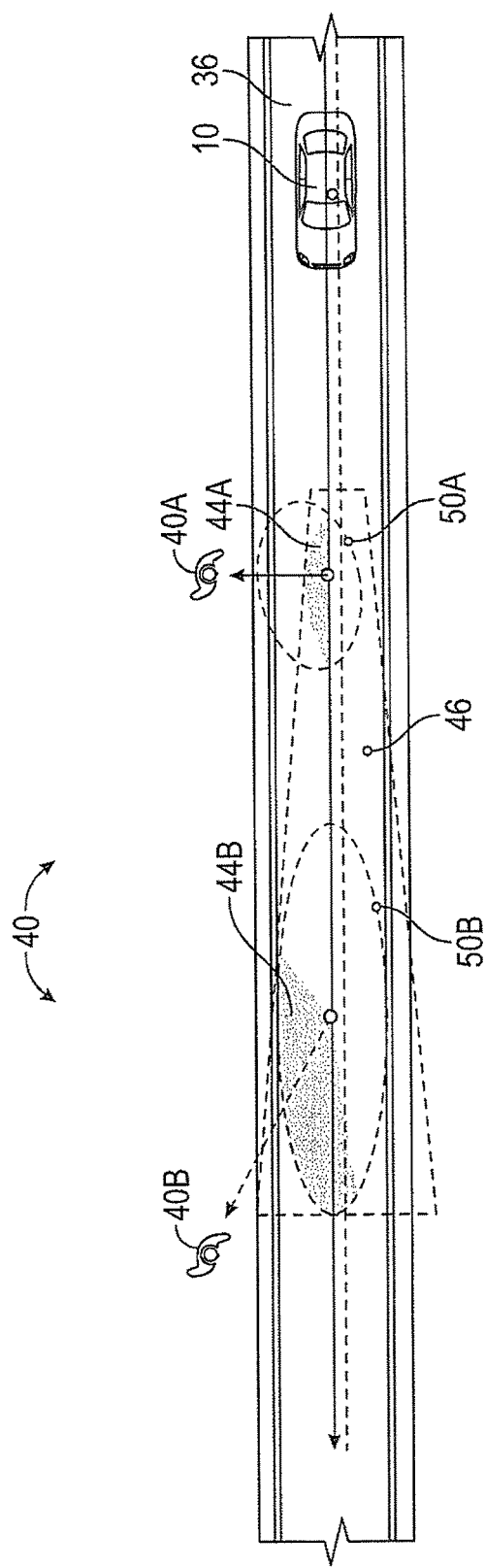
FIG. 7 a top view depicting operation of the exemplary warning system in accordance with another aspect of the present application.
Figure 8:
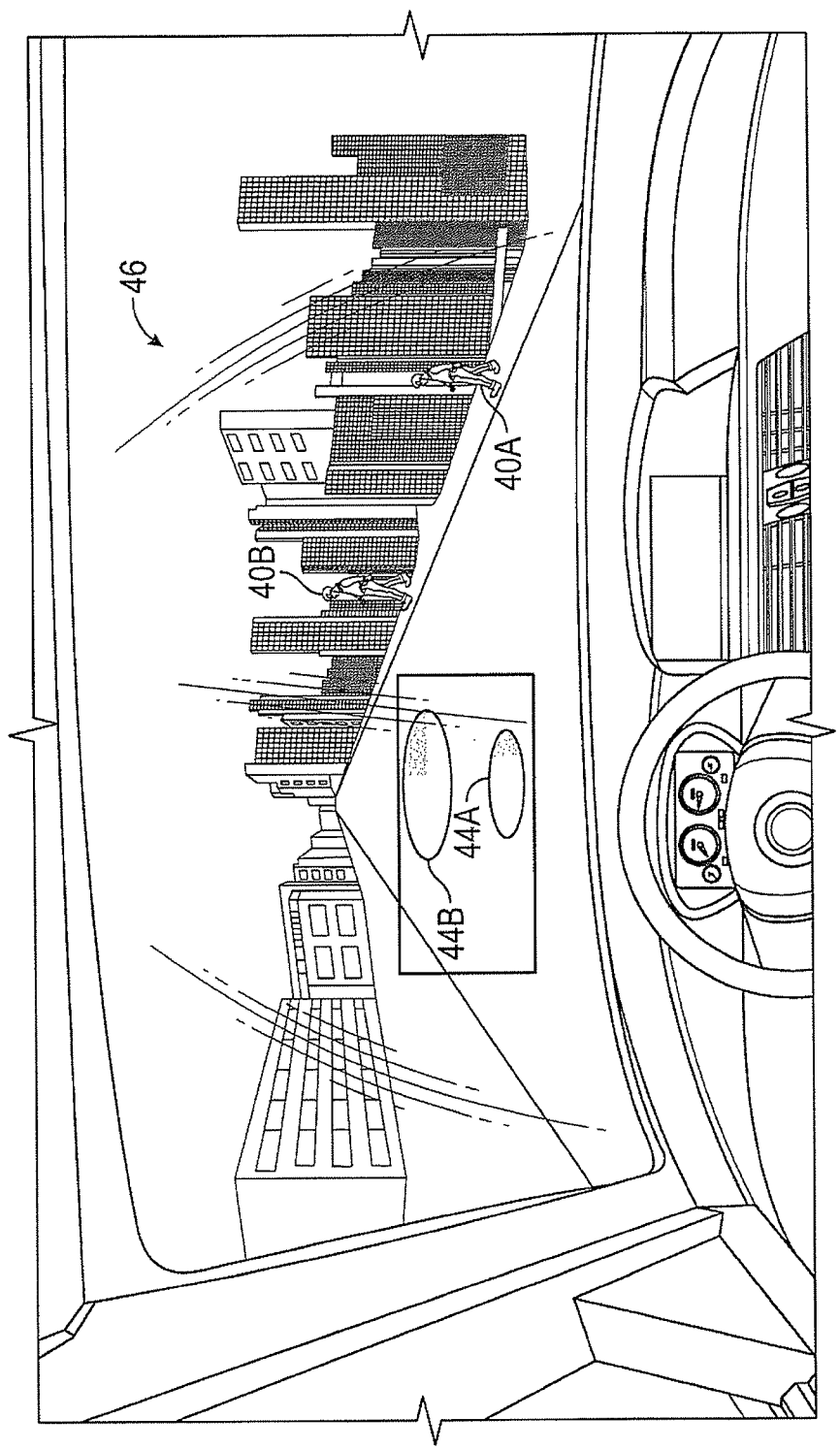
FIG. 8 shows one embodiment of an exemplary Augmented Reality (AR) visual generated by the warning system of FIG. 1 in accordance with one aspect of the present application.
Figure 9A:
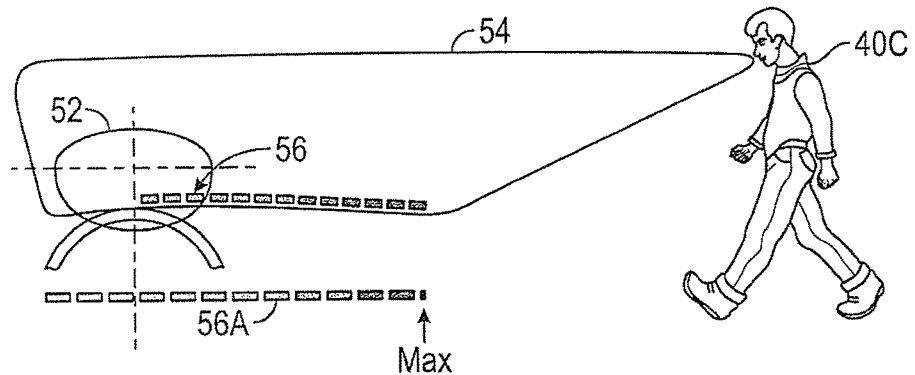
FIG. 9A-9B show side views generation of a warning indicator by the warning system of FIG. 1 in accordance with one aspect of the present application.
Figure 9B:
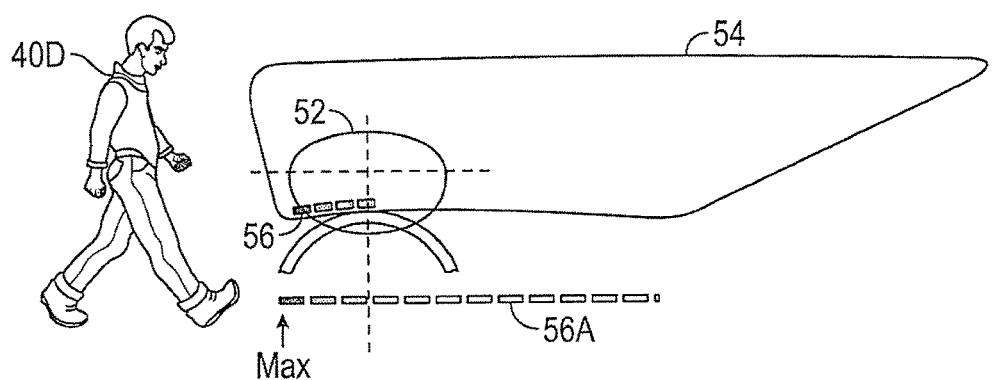
Figure 10A:
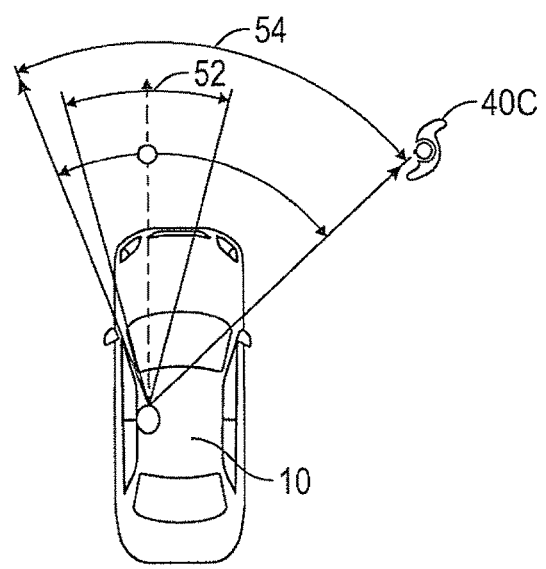
FIG. 10A is a top view indicating the different field of views (FOVs) of a driver of the vehicle.
Figure 10B:
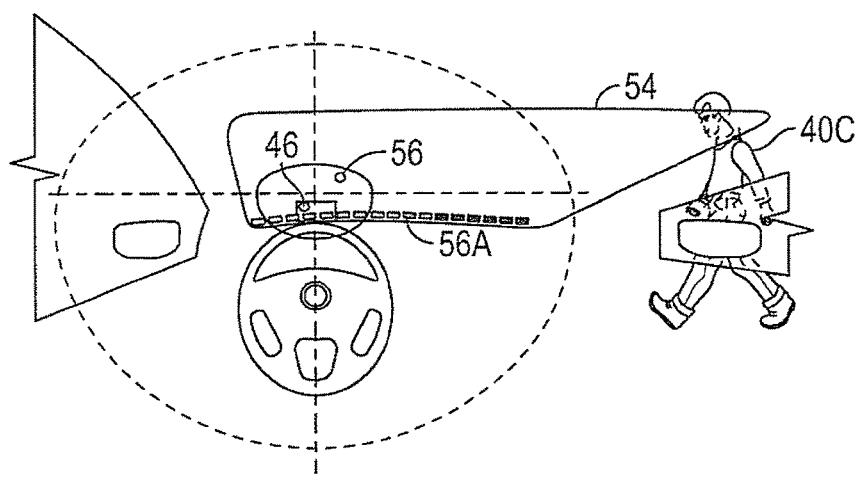
FIG. 10B is a side views showing the generation of the warning indicator of FIGS. 9A-9B in accordance with one aspect of the present application.

Referring to FIG. 7, as the vehicle 10 moves along a road 36, the system 12 may detect multiple pedestrians 40 located near the vehicle 10. The pedestrian 40A may be located closest to the vehicle 10, while the pedestrian 40B may be further away from the vehicle 10 than pedestrian 40A. Pedestrian 40A may have an associated warning base 48A and impact zone 50A which may form warning indicator 44A. Pedestrian 40B may have an associated warning base 48B and impact zone 50B which may form warning indicator 44B. The system 10 may be configured so that the display area 46 of the HUD 26 shows the closest warning indicator 44A. Showing the closest warning indicator 44A may lessen distractions to the driver and may draw the driver's attention to the more eminent issue. The warning indicator 44B may be shown on the display area 46 once the vehicle 10 passes the pedestrian 40A, if pedestrian 40A moves away from the vehicle 10 or when the warning base 48A and impact zone 50A no longer coincide.

As shown in FIG. 7, the associated warning base 48A and impact zone 50A may be smaller than the warning base 48B and impact zone 50B. Warning base 48B and impact zone 50B may be larger to coincide with the larger field of view of the driver to objects located at a greater distance from the vehicle 10.

Referring now to FIG. 1-8, an exemplary embodiment of an augmented reality generated and displayed by the warning system 10 may be seen. The augmented reality shown may be the FOV in front of the driver when the driver is seated in the vehicle 12. The control unit 22 may generate one or more graphical representations of pedestrians 40A-40B detected by the sensors 16. In the present embodiment, two pedestrians 40 may be seen as being in the FOV of the driver. To highlight the position of the pedestrians 40A, the warning indicator 44A may be placed adjacent to the pedestrian 40A. The warning indicator 44A may be positioned to draw the driver's attention to the pedestrian 40A in the FOV of the driver. The warning indicator 44 may flash and or blink to further draw the driver's attention to the pedestrian 40A in the FOV of the driver. The system 10 may be configured so that the display area 46 of the HUD 26 shows the closest warning indicator 44A. Showing the closest warning indicator 44A may lessen distractions to the driver and may draw the driver's attention to the more eminent issue. The warning indicator 44B may be shown on the display area 46 once the vehicle 10 passes the pedestrian 40A, if pedestrian 40A moves away from the vehicle 10 or when the warning base 48A and impact zone 50A no longer coincide.

Referring to FIGS. 9A-10B, when driving, the driver may have an effective FOV 52 and a general FOV 54. The effective FOV 52 may be the area directly in front of the driver where the driver may be focusing when driving. The general FOV 54 may be larger area than the effective FOV 52 and may include areas the driver may see if the driver where to move the eyes to the left and/or right or if the driver were to rotate his head to the left or right.

If a pedestrian 40 is out of the general FOV 54 or towards the outer edge of the general FOV 54 of the driver, the system 10 may inform the driver of the potential danger. As may be seen in FIGS. 9A-9B, the pedestrian 40C and 40D may be located proximate the vehicle 10 but outside the general FOV 52 of the driver. The system 10 may generate a warning indicator 56 to indicate a general position of the pedestrians 40C-40D who is out of or towards the outer edge of the FOV 52 of the driver. The warning indicator 56 may signal to the driver to turn and look in the direction of the warning indicator 56 to see the pedestrians 40C-40D. The warning indicator 54 may flash and/or blink to draw the driver's attention to the pedestrians 40C-40D.

The warning indicator 56 may be a light array 56A which moves towards the pedestrians 40C-40D. Thus, for the pedestrian 40C, the light array 56 may start on a left side of the display area 46 and moves towards the right side of the display area 46 as the pedestrian 40C moves closer to the FOV 52. For the pedestrian 40D, the light array 56 may start on a right side of the display area 46 and moves towards the left side of the display area 46 as the pedestrian 40D moves closer to the FOV 52. The light array 56 may change in color as the pedestrians 40C-40D move closer to the vehicle. The light array 56 may be color coded to indicate to the relative position of the pedestrians 40C-40D to the vehicle 10 and the potential danger of the vehicle 10 colliding with one of the pedestrians 40C-40D. For example, a first section of the light array 56 may start off in a first color (i.e., green), change to a second color (i.e., yellow) in a second section of the light array 56 as the pedestrians 40C-40D move closer to the vehicle, and turns to a third color (i.e., red) in a third section of the light array 56 if the pedestrians 40C-40D move within the estimate driving pathway 38 of the vehicle 10.

While embodiments of the disclosure have been described in terms of various specific embodiments, those skilled in the art will recognize that the embodiments of the disclosure may be practiced with modifications within the spirit and scope of the claims.

What is claimed is:

1. A system for warning of potential hazards when driving a vehicle, comprising:
   a sensor coupled to the vehicle capturing data of objects located around the vehicle; and
   a control unit coupled to the sensor processing the data captured by the sensor generating graphical representations of the objects captured by the sensor and warning indicators alerting a driver of the vehicle to the objects, the control unit calculating a projected path of each detected moving object among the objects and a projected travel path of the vehicle, the warning indicators generated when a calculated projected path of at least one detected moving object and the projected travel path intersect; and
   a heads-up display (HUD) displaying the graphical representations of the objects and the warning indicators, the warning indicators positioned on the HUD in directions toward each associated object.

2. The system of claim 1, wherein the HUD displays a single warning indicator of a closest object to the vehicle at a time.

3. The system of claim 1, wherein the control unit calculates a warning base area proximate each object indicating a potential movement area of each object, an impact zone area indicating a potential impact area between the vehicle and each object based on the potential travel path of the vehicle, wherein a common area where the warning base area coincides with the impact zone area for each object generates the warning indicators.

4. The system of claim 1, wherein the HUD displays a first warning type indicator for an object within a field of view (FOV) of the driver and a second warning type indicator for an object out of the FOV of the driver.

5. The system of claim 4, wherein the first warning type indicator is the common area where the warning base area coincides with the impact zone area for each object within the FOV of the driver.

6. The system of claim 4, wherein the second warning type indicator is a directional indicator pointing to the object out of the FOV of the driver.

7. The system of claim 6, wherein the second warning type indicator is a moving light array, the moving light moving in a direction towards the object out of the FOV of the driver.

8. The system of claim 7, wherein the moving light array is divided into a plurality of sections, each section being color coded.

9. The system of claim 1, further comprising monitoring sensors coupled to the vehicle and the control unit for monitoring at least one of a speed or a direction of travel of the vehicle.

10. The system of claim 1, further comprising a Global Positioning Satellite (GPS) system coupled to the vehicle and the control unit.

11. The system of claim 1, wherein the control unit comprises:
   an image processing module coupled to the sensor identifying the objects detected by the sensors;
   a path processing module calculating a projected path of moving objects detected by the sensor and the projected travel path of the vehicle; and
   an Augmented Reality (AR) processing module generating graphical representations of the objects detected by the sensor and the warning indicators.

12. The system of claim 11, wherein the graphical representations of the objects detected by the sensor are three dimensional representations.

13. A system for warning of potential hazards when driving a vehicle, comprising:
   image sensors coupled to the vehicle capturing pedestrians located around the vehicle;
   monitoring sensors coupled to the vehicle measuring speed and travel direction of the vehicle;
   a control unit coupled to the image sensors and monitoring sensors for processing data from the image sensors and monitoring sensors and generating graphical representations of pedestrians captured by the image sensors and warning indicators alerting a driver of the vehicle to the pedestrians captured, the control unit calculating a projected path for each detected moving pedestrian among the pedestrians and a projected travel path of the vehicle, the warning indicators generated when a calculated projected path of at least one detected moving pedestrian and the projected travel path of the vehicle intersect; and
   a heads-up display (HUD) to show the graphical representations of pedestrians captured by the sensor and the warning indicators, the warning indicators positioned on the HUD in directions toward each corresponding pedestrian, wherein the HUD displays a single warning indicator of a closest pedestrian at a time.

14. The system of claim 13, wherein the control unit calculates a warning base area proximate each pedestrian indicating a potential movement area of each pedestrian, an impact zone area indicating a potential impact area between the vehicle and each pedestrian based on the potential travel path of the vehicle, wherein a common area where the warning base area coincides with the impact zone area for each pedestrian generates each warning indicator.

15. The system of claim 14, wherein the HUD displays a first warning type indicator for a pedestrian within a field of view (FOV) of the driver and a second warning type indicator for a pedestrian out of the FOV of the driver, the first warning type indicator is the area where the warning base area coincides with the impact zone area for each pedestrian in the FOV of the driver, the second warning type indicator is a moving light array, the moving light array moving in a direction towards the pedestrian out of the FOV of the driver.

16. The system of claim 15, wherein the moving light array is divided into a plurality of sections, each section being color coded.

17. The system of claim 13, wherein the control unit comprises:
   an image processing module coupled to the sensor identifying the pedestrians detected by the sensors;
   a path processing module calculating a projected path of moving pedestrians detected by the sensor and the projected travel path of the vehicle; and
   an Augmented Reality (AR) processing module generating graphical representations of the pedestrians detected by the sensor and the warning indicators.

18. A system for warning of potential hazards when driving a vehicle, comprising:
   image sensors coupled to the vehicle capturing pedestrians located around the vehicle;
   monitoring sensors coupled to the vehicle measuring speed and travel direction of the vehicle;
   a control unit coupled to the image sensors and monitoring sensors for processing data from the image sensors and monitoring sensors and generating three dimensional graphical representations of pedestrians captured by the image sensors and warning indicators alerting a driver of the vehicle to the pedestrians captured, the control unit calculating a projected path for each detected moving pedestrian among the pedestrians and a projected travel path of the vehicle, the warning indicators generated when a calculated projected path of at least one detected moving pedestrian and the projected travel path of the vehicle intersect; and
   a heads-up display (HUD) showing the graphical representations of pedestrians captured by the sensor and the warning indicators, the warning indicators positioned on the HUD in directions toward each corresponding pedestrian, the HUD displays a single warning indicator of a closest pedestrian at a time, wherein the HUD displays a first warning type indicator for a pedestrian within a field of view (FOV) of the driver and a second warning type indicator for a pedestrian out of the FOV of the driver.

19. The system of claim 18, wherein the control unit calculates a warning base area proximate each pedestrian within a FOV of the driver indicating a potential movement area of each pedestrian within a FOV of the driver, an impact zone area indicating a potential impact area between the vehicle and each pedestrian based on the potential travel path of the vehicle, wherein a common area where the warning base area coincides with the impact zone area for each pedestrian generates each first warning type indicator.

20. The system of claim 18, wherein the second warning type indicator is a moving light array, the moving light moving in a direction towards the pedestrian out of the FOV of the driver.

* * * * *